United States Patent Office 2,885,611
Patented May 5, 1959

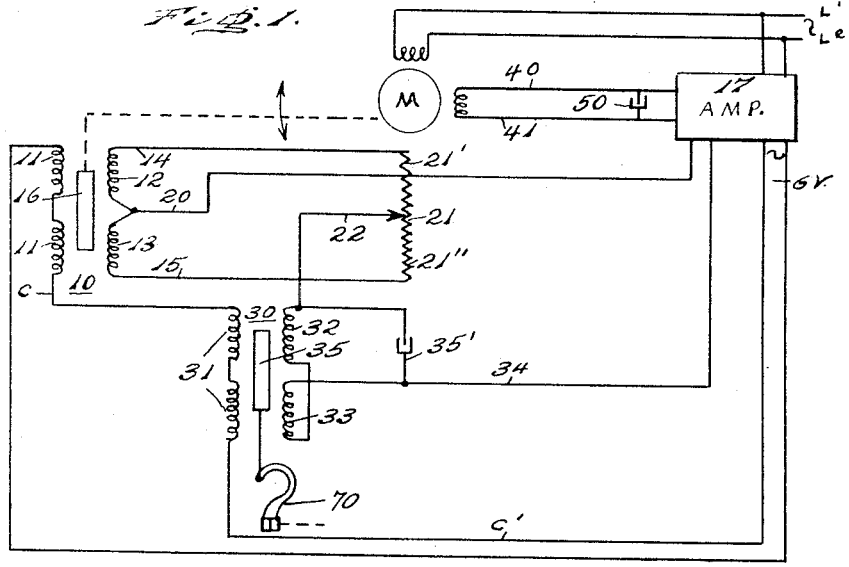
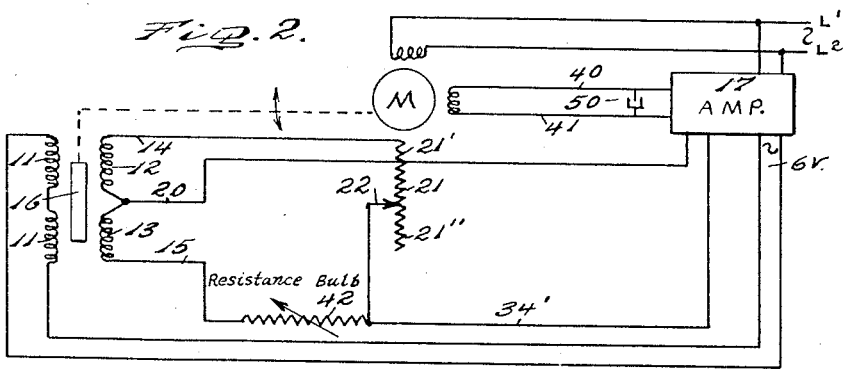
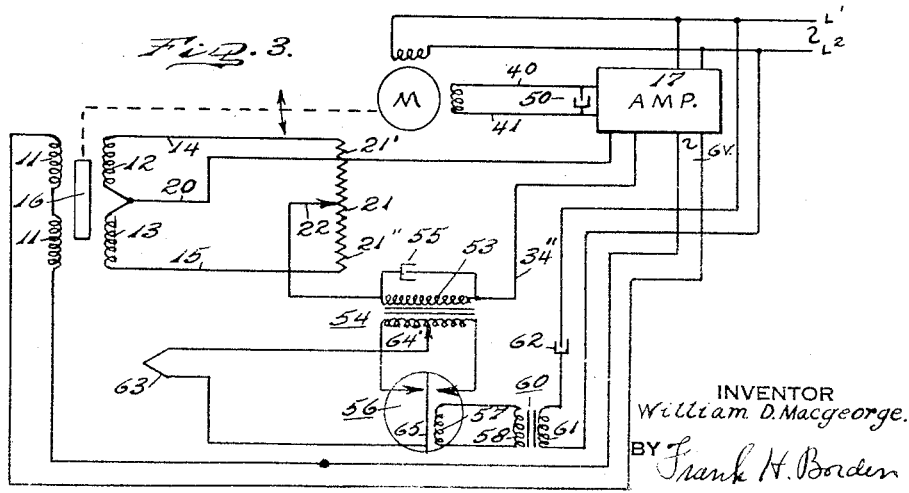
INVENTOR
William D. MacGeorge.
BY Frank H. Borden
ATTORNEY

2,885,611

TELEMETERING SERVOMOTOR SYSTEM

William D. Macgeorge, Lansdale, Pa., assignor to Automatic Timing & Controls, Inc., a corporation of Pennsylvania Application June 10, 1954, Serial No. 435,896

7 Claims. (Cl. 318—28)

This invention relates to telemetering systems.

It is among the objects of the invention to improve the art of telemetering, to provide a voltage bridge as a telemetering circuit; to provide a telemetering circuit comprising a voltage bridge which functions non-resistively; to provide a telemetering circuit of extreme flexibility to accord with telemetering of a wide range of variables, extending from those variables in which change of condition is manifested by a more or less slight physical movement to those represented by temperature changes or a variable D.C. output; to provide a new and novel telemetering organization in which a standard receiver unit comprising a voltage bridge is disposed for operative association selectively with any one of three standard telemetering transmitters, respectively operating by a differential transformer, by resistance change, and by D.C. millivolt type signal, for enhanced flexibility of application to any variable; to provide a phase-sensitive voltage bridge in a telemetering circuit; to provide a voltage bridge circuit which can respond to phased telemetering signals; to provide a telemetering voltage bridge of low resistance responsive to signals of small amplitude; to provide a telemetering system comprising a voltage bridge incorporating a differential transformer; to provide a telemetering circuit of a voltage bridge, the output of which is in series with transmitted telemetered signals and in which the bridge is unbalanced to neutralize the telemetered signal as a measure of the condition change of the associated variable; to provide as a commercial telemetering organization a single common receiver unit comprised of a modified differential transformer, the aiding secondaries of which comprise respectively legs or arms of a voltage bridge energized by the primary of the transformer, and the movable element of which differential transformer is positioned by a servo motor fed by an amplifier, with the other legs or arms of the voltage bridge comprising a potentiometer, serving as a rheostat when a resistance bulb transmitter is associated with the bridge, with connections for a selected transmitter, and a plurality of standard commercial transmitters, respectively comprising a diferential transformer, the movable element of which is controlled by a variable, with connections for insertion in series with the output of the voltage bridge, a D.C. millivolt output device for insertion in series with the output of the bridge, and a resistance bulb for connection to the slide wire arm of the potentiometer and to one end of a secondary of the receiver differential transformer to complete the voltage bridge and responsive to changes in thermal effects incident on the bulb; to provide a telemetering circuit in which a voltage bridge is provided, two legs of which are series aiding secondaries of a modified differential transformer and the other two legs of which are resistance elements, having a bridge output between the last two legs and between the said two secondaries, with means for impressing a telemetered signal in series with the bridge output, neutralized by adjustment of the movable element of the modified differential transformer; and other objects and advantages will become more apparent as the description proceeds.

There have been many telemetering systems developed in the prior art in which a differential transformer has been used in a network, balanced against either a second differential transformer or a slide wire potentiometer. These are well shown, for instance, in the patents to Hornfeck, No. 2,420,539, and No. 2,406,221, among other related disclosures. In all of these systems with which applicant is familiar, however, the secondaries of the differential transformer are in series in a loop circuit, either with the secondaries of the second differential transformer or with a slide wire or potentiometer, so that unbalance in the loop circuit by change of output from the bucking secondaries of one transformer is rebalanced by the change of output from the bucking secondaries of the other transformer, or by the changed resistance of the potentiometer in the loop circuit, (or vice versa in the latter case). In all of these known instances, however, both the transmitter and the receiver include movable elements, respectively displaceable at the transmitter in response to a change in condition of the variable to unbalance the loop network, and responsive to the unbalance of the network to convert the unbalance into a displacement of the movable element of the receiver, to rebalance the loop network. So far as understood, in all previous cases, each telemetering system was individually formed for the complete but limited functioning it possessed, i.e., for association with a variable which could cause the physical displacement of the one part, to unbalance the loop, which unbalance caused movement of the other part, for rebalance, and where the signal arose by changes in a variable which could not effect such part physical displacement the system could not be used. In other words, wherever a differential transformer was used in the receiver, actuated by a servo motor running as a function of unbalance, it has had to be associated with a transmitter actuated by displacement of a moving part. As noted, this effects a limitation upon the field of use of this type of system.

In connection with differential transformers, applicant has made a number of improvements therein, of which an outstanding one is disclosed in his Patent. No. 2,568,-587, which is relevant to the instant invention. By this invention he has made a highly flexible differential transformer in the sense that with a basic coil winding organization he has freedom in the interconnection of the various wires of the coil organizations to secure any desired inductive coupling of the components, so that he can selectively establish a turn ratio between primary and secondary which is greater than 1:1, smaller than 1:1, or which is 1:1, according to desired output results and in which the secondaries and the primaries respectively can be coupled in series aiding or series bucking. This recited transformer effects a longer flux path and thus has increased the range of linearity of output of the transformer from the null output. This is accomplished with a motion of armature to coil from null of the order of .15", which is in contrast to the best known previous differential transformer which had a stroke from null of the order of .05" for the limit of its linear output.

According to the basic concept of the present invention, a "standard" receiver is provided incorporating a servo motor, and a modified differential transformer, preferably, although not necessarily, constructed in accordance with said Patent 2,568,587, the movable element of which (usually the armature) is positioned by the servo, and any desired indication, or work, being accomplished also by the servo. The secondaries of this modified differential transformer are disposed in series aiding relation as two legs of a voltage bridge having a common output terminal at their junction. A "standard" amplifier is provided, the output of which feeds the servo motor, and having an input comprising the output of the voltage bridge, one lead of which, is from the common terminal of the two secondaries of the modified differential transformer of the receiver, and the other of which is from a center tap of two resistance legs, or from the slider of a potentiometer, completing the voltage bridge. The voltage bridge is powered by the primary of the differential transformer.

These parts just enumerated are standard and are provided for all telemetering functions, regardless of the special detailed organizations of the associated portions selected to comport with the particular variable to be sensed. The partial voltage bridge established by the modified differential transformer is particularly effective when the differential transformer of said application is used, as the secondaries, forming the respective two legs, are readily interconnected in series aiding relation to furnish the common terminal forming one side of the output from the ultimate voltage bridge. The advantages of supplying the power for the bridge from the primary of the modified differential transformer will be manifest, not the least of which is the low voltage on the bridge, and the isolation of the bridge from the power supply allowing complete grounding and interconnection with the other signal sources. In the armature and coil organization just explained, with the modified differential transformer in its null output relative positioning of the armature and coils, the voltage induced in the respective secondaries will be equal and additive to null on the common terminal. When the bridge is completed by two other equal resistance legs, to be described, there will be no signal output from the bridge with null on the common terminal. As the armature moves relatively to the coils from the null symmetrical positioning there will be a differential voltage transferred from the primary coil to the respective bridge legs comprising the transformer secondaries, with a voltage of a given phase, approximately 90° out of phase with that of the primary voltage, in one coil or bridge leg, of increasing amplitude with continued movement, with a complemental decrease in amplitude of the voltage (also approximately 90° oppositely out of phase with the primary voltage) in the other secondary or bridge leg. With no other change in the bridge circuit, there will be a signal from the output of the bridge determined by the dominant amplitude in the respective bridge legs. This is a voltage unbalance and not a resistive unbalance of the bridge. When the potentiometer completing the bridge is resistively unbalanced, the signal from the modified differential transformer can be neutralized.

The respective transmitter units to be discussed vary the output signals of the bridge by means of resistive changes in the bridge, or by introducing voltage signals in series with the bridge output, as will appear.

In the drawings,

Fig. 1 illustrates schematically the standard wiring diagram of the common receiver unit with the secondaries of a modified differential transformer comprising half of the bridge circuit, which is completed by a potentiometer, with a transmitter unit comprising an unmodified differential transformer responsive to a variable, in series with the output of the voltage bridge so that the bridge output is balanced against the transmitter signal.

Fig. 2 represents diagrammatically the same receiver unit with a resistance bulb connected between the slide element of the potentiometer and the end of a secondary of the differential transformer, so that the voltage bridge is completed by the potentiometer, functioning as a rheostat, and by said resistance bulb.

Fig. 3 represents diagrammatically the same receiver unit with its voltage bridge, and having its output balanced against a converted D.C. signal, as from a thermocouple or the like.

In all of the diagrams, the receiver organization comprises the modified differential transformer 10, having the primary 11, and the two secondaries 12 and 13 in series aiding relation. One end of secondary 12 has a connector 14 leading in all figures to the upper end of potentiometer 21, and one end of secondary 13 has a connector 15 leading, in Figs. 1 and 3, to the lower end of potentiometer 21, to complete the voltage bridge. The differential transformer 10 has an armature or core 16, the position of which relative to the complemental stator portions of differential transformer 10, is controlled by the servo motor M, as by an actuated member diagrammatically indicated in dotted lines. The motor is a two phase reversible motor with one phase, 40 and 41, running as a function of the output of the amplifier unit 17. Supply lines L1 and L2 feed the amplifier unit as well as the other motor winding with basic power. The meeting ends of the secondary coils 13 and 12 have a common output line 20, furnishing one lead of the output of the bridge into the amplifier 17. The amplifier, illustratively has a reduced voltage output, say, of the order of six volts, as indicated by symbols on the drawings, supplying the primary 11 of the transformer 10.

It will be seen that with the receiver modified differential transformer 10 at null, the potentiometer comprised of wire 21 and slider arm 22, which divides the potentiometer into upper leg 21' and lower leg 21", can be adjusted to establish balance in the bridge circuit. With a given on or off null positioning of the receiver transformer 10, the other legs of the bridge, namely 21' and 21", can be brought into balance therewith by manual adjustments of slider 22, so that there is no output from the voltage bridge formed of the coils 12 and 13, and the slide wire portions or elements 21' and 21" across bridge output connections 20 and 22. It will be understood that wire 21 and arm 22, when once set, can remain fixed thereafter, or it may initially comprise a fixed voltage divider having a center or other set tap.

In order to impress a transmitter signal on the bridge output thus described, in the first instance, (Fig. 1) an unmodified differential transformer 30, or a plurality thereof, if desired for various mathematical or geometrical ratios or resultants, is provided, each or the one having the primary 31 and the opposed secondaries 32 and 33, in bucking series, or any other desired bucking output relation, with one end of the transmitter secondaries coupled in series to the sliding element or center tap 22 of the potentiometer or voltage divider, with the other end thereof joined to lead 34, connected to the amplifier 17. Leads 20 and 34 comprise the voltage bridge resultant output lines, input to the amplifier.

It will be seen that the output of coil 12 in bridge output circuit 20 and 34 is opposed by the output of coil 13 in said bridge output circuit.

The armature 35 of the transformer 30 is coupled to a device responsive to a selected variable, such as pressure, for purely illustrative instance, as by means of a Bourdon tube, or the like. It will be understood that the receiver organization may be in a control room at a remote point relative to the location of the transmitting differential transformer, and it may not be convenient to establish a related output from the transmitting and receiving differential transformers. It may be, therefore, that a signal is transmitted into the output of the voltage bridge, which is instantaneously relatively improper. In lieu of adjustments at the transmitter, the slider 22 is adjusted to neutralize this signal and balance the circuit.

It will be understood from the preceding description that the entire circuit can be balanced with respect to any datum condition for the transmitter transformer 30. It will further be understood that any movement of the armature 35 from the instantaneous condition at which balance has been achieved will impose a differential transformer output between 22 and line 34 of one phase or the opposite phase, depending upon the preponderance of the amplitude of the voltage in one or the other secondary coil 32 or 33 over that of the other coil. This signal will therefore be of a given phase and of given amplitude, and will add to or subtract from the voltage bridge output accordingly. There will, therefore, be a total or net or resultant bridge output into the amplifier 17, which will run the motor M in the proper direction as to move the armature 16 of the modified differential transformer 10 so that it will eventually develop in the legs 12 and 13 the necessary respective voltages to unbalance the voltage bridge so as to cancel or neutralize the output of the transmitter transformer 30, and cause the motor to stop. Any subsequent change in the condition being measured or sensed, effective on the transmitter differential transformer 30 will again send a signal output to the amplifier causing the motor to run to unbalance the circuit and neutralize the output signal.

It will be understood that any additional resistance legs may be added to the respective ends of the potentiometer wire 21 as may be found expedient, as the range of adjustment of slider 22 may be quite small. A condenser 35' is preferably connected across the ends of the secondaries of the transformer 30 to improve the phasing of the circuit.

It needs only to be added that the primary 31 of the transmitter differential transformer or the plurality thereof, is connected in series with the primary 11 of the receiver differential transformer and to the reduced voltage output of amplifier 17, and the entire voltage bridge circuit is thus energized.

In the organization as thus far described, it will be seen that the bridge circuit functioning is not resistive, that is, there is no change in the resistance of any leg to secure the desired result after the potentiometer is once set for balance with the instantaneous differential transformers settings. It will be noted furthermore, that the two differential transformers mentioned do not have their secondaries in a loop circuit in series.

It is pointed out that the condition to which the circuit as just described is relevant is one which can be or is manifested by movement, arising from changes in the condition of the variable. These variables illustratively may comprise pressure, manifested by the changes in deformation of a Bourdon tube, a bellows, or the like, rates of flow or the like manifested by movement of some part as a function of flow rate, liquid level, a machine adjustment, and the like. A Bourdon tube 70 is shown in Fig. 1, as a purely illustrative element having a portion movable in response to changes of condition of an associated pressure variable, for controlling the movements of the armature 35.

The operation of the organization just described of Fig. 1 is quite simple in adjustment and is extremely quick and accurate in its functioning. With the potentiometer set to balance the bridge in accordance with the null setting of the receiver modified transformer 10, and with a null setting of the transmitter transformer 30, or with related settings thereof, the amplifier input through leads 20 and 24 will be substantially zero. When a change in the condition of the variable occurs, the armature 35 of the transformer 30 moves relative to the bucking secondaries 32 and 33 thereof, to furnish a transformer output of given phase or a phase substantially 180° away from the given phase, and of amplitude linearly proportional to the degree of displacement within its range. The potentiometer or slide wire portions 21' and 21", as noted, comprise the other half of the bridge, of which the first half is comprised of secondaries 12 and 13 of transformer 10, and transformers 30 and 10 comprise signal devices for respectively unbalancing, and rebalancing, the voltage bridge output circuit. Any signal thus developed or as will be seen, any other form of transmitter signal applied in series with the bridge output, unbalances the output circuit, and creates a signal between leads 34 and 20 of the given or opposite phase and amplitude. This causes the amplifier to impress a motor-running circuit on the servomotor to run in the proper direction to move the armature 16 in the proper sense as to cause or to increase unbalance between the voltages induced in the respective secondaries 12 and 13, of substantially opposite phase from that of the transmitter signal, and of progressively increasing relative amplitude until rebalance of the output circuit is accomplished and the motor stops.

It will be observed that the bridge in this instance does not function resistively. It will also be seen that when once adjusted by the potentiometer no further adjustments are needed, so that the potentiometer can be replaced by a center or other fixed tap coil or the like, which may be of the same impedance as the total impedance of the two secondaries 32 and 33. The impedances need not be identical, but it is preferred to maintain the bridge resistance of the low level established by the low resistance of the transformer secondaries.

When the condition to be telemetered or measured is heat, the transmitting unit completing the bridge circuit, or modifying its output signal, may comprise a resistance bulb or the converted output of a thermocouple. The resistance bulb organization will first be described.

Referring now to Fig. 2, the "receiver" is the same as has been described of Fig. 1 and bears the same reference characters. The line 14 from the same half of the voltage bridge as is established by the receiver differential transformer 10 leads to one end of the potentiometer 21, functioning as a variable resistance 21', forming the third leg of the voltage bridge, and the slider 22 leads to one side of the resistance bulb 42, forming the other leg of the voltage bridge. The resistance bulb connects at one end with the lead 15, and at the other by line 34' to the amplifier 17. As is known, the resistance bulb is a resistance wire organization, the resistance of which varies substantially linearly with the variations of heat incident on the wire. In the telemetering circuit using the resistance bulb, although the voltage bridge functions resistively in unbalance, its output is restored to null by the differential voltage output of the receiver transformer. Again it is pointed out that the voltage bridge is powered or energized by the voltage in the primary of the receiver transformer.

In another form of heat responsive organization, as shown in Fig. 3, in which, as in Fig. 1, the voltage bridge functions non-resistively, the bridge is comprised of the secondaries of modified differential transformer 10 and the legs 21' and 21" of potentiometer 21. The slider element 22 of the potentiometer, by a connector 52, passes through the secondary 53 of a transformer 54, bridged by a condenser 55, and leading by connector 34" into the amplifier 17. A vibrator 56 has an energizing coil 57 in a loop with a secondary 58 of a transformer 60, the primary 61 of which leads through a condenser 62 to lines L1 and L2. A variable source of D.C., which may be any variable D.C. signal but which, illustratively, is a thermocouple, is provided at 63, which D.C. signal varies with changes of condition of a variable, such as by variations in incident temperatures, and one lead thereof goes to the center tap of the primary 64 of transformer 54, while the other is connected to the vibrating contact 65 of the vibrator 56. This is a further development of means for impressing an A.C. signal in series with the bridge output. This organization introduces a separate power source into the network and may tend to introduce errors with fluctuations of line voltage impressed on the bridge. However, with proper phasing and stabilizing, such as by the use of electronic regulators of various sorts, as represented, for instance, by "Sola" transformers, this potential inaccuracy can be avoided. It will be seen that in this last mentioned organization the bridge circuit functions with signals and not resistively.

It will be appreciated that in addition to the standard "receiver" consisting of the standard amplifier mentioned and the standard bridge circuit, there may be three additional standardized units interchangeably used with the other equipment, and comprising the standard differential transformer transmitter (or plurality thereof), the standard resistance bulb unit, or plurality thereof, and the standard D.C. signal converter unit, or plurality thereof. In the usual case, there will be but a single transmitter signal unit. It will also be understood that the transmitter may comprise one or more differential transformers and/or one or more resistance bulbs, and/or one or more D.C. converter devices where it is desired to have a resultant or net telemetered signal arising from a plurality of different types of variables.

With a deviation in the voltage of the D.C. source, the amplitude of the effective A.C. impressed in series with the bridge output changes so that it is greater or smaller than the amplitude of the A.C. signals on coils 12 and 13, and an A.C. signal of the proper sense is put out from the bridge into the amplifier 17 to run the motor in the right direction as to move the armature 16 to rebalance the output circuit.

Having thus described my invention, I claim:

1. In telemetering, a modified differential transformer comprising a primary and a secondary winding, said secondary winding comprising two coils in series-aiding relation with a first common bridge lead connection brought out, an armature positionable axially of said coils to control the voltages therein, said coils forming two arms of a voltage bridge powered by the primary winding, means establishing two resistive arms connected to said coils to complete the bridge and with a second common bridge lead connection brought out, a reversible servo motor positioning said armature functionally with servo movement, said voltage bridge having a basic instantaneous signal output established by the instantaneous relation of the armature to the coils and of the resistive arms to the coils and to each other, means responsive to fluctuation of the condition of an associated variable for algebraically adding to an existent basic bridge signal to form a resultant amplifier input signal, amplifying means supplied with said resultant signal and responsive to any signal other than substantial null to energize the servo motor to actuate same in the proper sense and the proper degree to reposition the armature relative to the coils to bring said resultant signal to substantial null at which said servo motor and armature stop and remain stationary until such time as a succeeding fluctuation of said condition modifies the existent substantial null to place a new resultant signal on the amplifying means to again actuate the servo.

2. Telemetering as recited in claim 1, in which the means responsive to fluctuation of a condition comprises at least one effectively A.C. signal device in series with the bridge output.

3. Telemetering as recited in claim 1, in which the means responsive to fluctuation of a condition comprises at least one unmodified differential transformer.

4. Telemetering as recited in claim 1, in which the means responsive to fluctuation of a condition comprises at least one D.C. signal converter.

5. Telemetering as recited in claim 1, in which the means responsive to fluctuation of a condition comprises a resistance changer in the bridge circuit.

6. Telemetering as recited in claim 1, in which the means responsive to fluctuation of a condition comprises at least one resistance bulb in the bridge circuit.

7. A telemetering system comprising a reversible servo motor, amplifying means supplying said servo, a modified differential transformer comprising a primary winding, a secondary winding comprising two secondary coils in series aiding relation with a first common connection brought out and an armature positionable by the servo motor relative to the windings to vary the voltage induced in the respective secondary coils with running of the servo motor, means establishing two resistive elements with a second common connection brought out, error-signal-modifying means in series with a network including said secondary coils, resistive elements, said common connections and said amplifying means and including a voltage bridge powered by said primary winding and comprising said secondary coils and said resistive elements, for applying a signal to the amplifying means of one or the opposite phase or substantial null, said servo motor for a given error signal to the amplifying means running in the proper direction to move the armature toward nulling of said error signal to the amplifying means on the attainment of which null the servo motor stops, said error signal-modifying means being responsive to fluctuations in the condition of an associated variable to change the signal from null as a function of a change in such condition.

References Cited in the file of this patent

UNITED STATES PATENTS

| | | |
|---|---|---|
| 2,362,661 | Peters et al. | Nov. 14, 1944 |
| 2,363,690 | Razek | Nov. 28, 1944 |
| 2,406,221 | Hornfeck | Aug. 20, 1946 |
| 2,420,539 | Hornfeck | May 13, 1947 |
| 2,439,891 | Hornfeck | Apr. 20, 1948 |
| 2,491,606 | Dickey et al. | Dec. 5, 1949 |
| 2,495,844 | Hornfeck | Jan. 31, 1950 |
| 2,611,812 | Hornfeck | Sept. 23, 1952 |
| 2,612,628 | Hornfeck | Sept. 30, 1952 |
| 2,774,019 | Hornfeck | Dec. 11, 1956 |